No. 714,133. Patented Nov. 25, 1902.
A. BLATIN.
NURSING BOTTLE.
(Application filed June 18, 1901.)
(No Model.)

WITNESSES:
Isabella Waldron.

INVENTOR.
Antoine Blatin
BY Richards & Co
ATTORNEYS

UNITED STATES PATENT OFFICE.

ANTOINE BLATIN, OF PARIS, FRANCE.

NURSING-BOTTLE.

SPECIFICATION forming part of Letters Patent No. 714,133, dated November 25, 1902.

Application filed June 18, 1901. Serial No. 64,997. (No model.)

*To all whom it may concern:*

Be it known that I, ANTOINE BLATIN, doctor, a citizen of the Republic of France, and a resident of Paris, France, have invented a Nursing-Bottle, of which the following is a specification, this invention having been patented in France April 15, 1901, (patent not delivered;) in England May 28, 1901, No. 10,981, and in Germany May 29, 1901, (not delivered.)

The apparatus which forms the object of this invention consists of the combination of a small digester suitable for household use, enabling milk to be sterilized by raising it without boiling to a temperature sufficient to destroy lactic and the like ferments which are destroyed at temperatures exceeding 100°, and a feeding-bottle cover adapted to be directly fitted on the digester in order to allow an infant to suck the sterilized milk contained in the digester without the necessity of transferring the milk to another vessel.

In order to allow this invention to be better understood, reference will now be made to the accompanying drawings, which show one form of construction of this invention.

Figure 1:
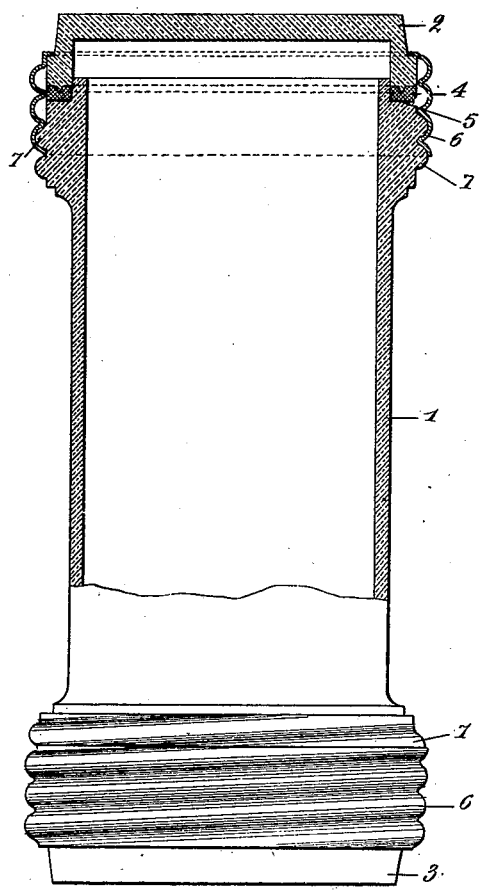
Figure 2:
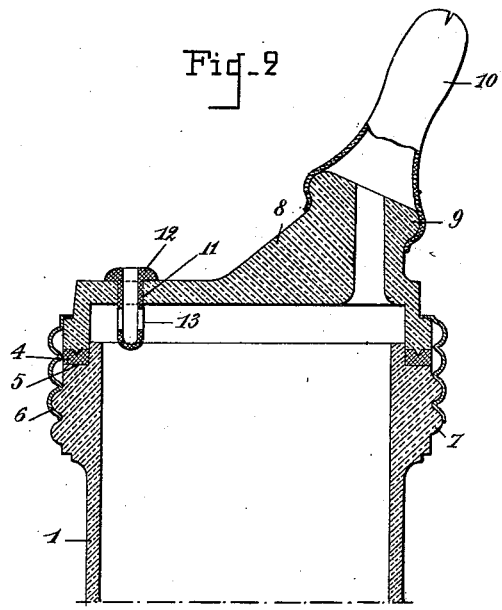

Figure 1 is an elevation, partly in section, of the apparatus constituting the sterilizing and digesting vessel. Fig. 2 is a view of the same provided with a nipple cover or lid.

The same reference-numerals indicate like parts in both figures.

The apparatus comprises, as before stated, two parts or elements—the sterilizer or digester proper and the feeding-nipple and cover.

The sterilizer consists of a cylinder or rounded vessel 1, formed of glass, crystal, porcelain, or other material which is not liable to be attacked by the substances treated, the internal surface of which is absolutely smooth and which vessel is open at both ends, so as to allow of its being perfectly cleansed. These ends may be hermetically closed by means of caps or externally-fitted lids 2 and 3, placed on india-rubber washers 4, fitted in a shoulder or groove 5, formed in the external part of the vessel, which for this object is thickened at each end. The sealing is effected by a screw-ring 6, screwing on a thread 7, formed on the external wall of the cylinder, which ring exerts a gripping action upon the edges of the cap. This gripping forces the edge of the lid upon the rubber or like washer 4, which being placed externally is never in contact with the contents of the vessel.

The special form given to the sterilizing-digester allows of a very regular expansion of the material of which it is formed, and consequently prevents any chance of its rupture under the action of the heat, while the enlargements of the ends of the digester prevent the body thereof from touching the walls of the water-bath or the like in which it is heated, and thus further diminish the danger of breakage. The form of the lids allows of the expansion of the liquid under the action of the heat without causing the vessel to burst.

In order to enable the apparatus to be employed as a feeding-bottle, it suffices to remove one of the caps 2 or 3 and to replace it by the feeding-lid shown in section in Fig. 2. This feeding-bottle lid is arranged like an ordinary lid, with the sole difference that it has a pipe 8 with a socket 9, on which an ordinary feeding-bottle nipple 10 is placed. In order to allow of the infant drawing the milk freely, the lid is provided with an opening 11, on which an india-rubber valve 12 is fitted, arranged in the ordinary manner for allowing air to enter, while preventing liquid from escaping, simple lateral slots 13 in the valve enabling this result to be attained.

The apparatus hereinbefore described has the advantage of enabling a complete sterilization of the milk to be effected, seeing that by means of this apparatus the milk may be raised to the temperature necessary for completely destroying lactic ferments without causing it to boil, which latter has the drawback of changing the character of the milk. The apparatus also has the advantage of being adapted for use as a feeding-bottle without its being necessary to effect any transfer of the milk to another vessel in the open air, which is always liable to be deleterious to the final result of the sterilization.

The form given to the sterilizing vessel enables it to be cleaned easily, completely, and rapidly, and the absence of any internal recess prevents permanent accumulations, which are difficult to remove.

The forms, dimensions, proportions, and accessory parts may be varied as desired.

I declare that what I claim is—

A nursing-bottle comprising a cylindrical body, a bottom closing-cap at one end, the opposite end having an annular rabbet and a threaded exterior, a packing seated in said rabbet, a cover resting against said packing and having a thickened and extended portion provided with an exit-passage, an exterior rib on said extended portion, a rubber nipple engaging said rib, and a metallic threaded sleeve clamping said cap to the threaded end of the bottle, substantially as described.

In witness whereof I have hereunto set my hand in presence of two witnesses.

ANTOINE BLATIN.

Witnesses:
  EDWARD P. MACLEAN,
  JULES FAYOLLET.